United States Patent [19]

Kanamori et al.

[11] Patent Number: 4,822,399

[45] Date of Patent: Apr. 18, 1989

[54] GLASS PREFORM FOR DISPERSION SHIFTED SINGLE MODE OPTICAL FIBER AND METHOD FOR THE PRODUCTION OF THE SAME

[75] Inventors: Hiroo Kanamori; Hiroshi Yokota; Gotaro Tanaka; Yoichi Ishiguro; Masahiro Takagi; Hiroshi Suganuma; Masayuki Shigematsu, all of Yokohama, Japan

[73] Assignee: Sumitomo Electric Industries, Ltd., Osaka, Japan

[21] Appl. No.: 60,176

[22] Filed: Jun. 10, 1987

[30] Foreign Application Priority Data

Jun. 11, 1986 [JP] Japan .................. 61-133762
Mar. 6, 1987 [JP] Japan .................. 62-50276
Mar. 9, 1987 [JP] Japan .................. 62-52089

[51] Int. Cl.$^4$ .................................. C03B 37/018
[52] U.S. Cl. .................................. 65/3.12; 65/18.2; 65/900; 65/DIG. 16
[58] Field of Search .................. 65/3.11, 3.12, 3.2, 65/13, 18.2, DIG. 16, 900

[56] References Cited

U.S. PATENT DOCUMENTS

| | | | |
|---|---|---|---|
| 3,933,454 | 1/1976 | Deluca | 65/3.12 |
| 4,165,915 | 8/1979 | Rau | 65/3.12 |
| 4,283,213 | 8/1981 | Akers | 65/13 |
| 4,306,767 | 12/1981 | Kawachi | 65/3.12 |
| 4,310,339 | 1/1982 | Blankenship | 65/13 |
| 4,620,861 | 11/1986 | Berkey | 65/13 |
| 4,629,485 | 12/1986 | Berkey | 65/3.11 |
| 4,675,038 | 6/1987 | Ainslie | 65/18.2 |

FOREIGN PATENT DOCUMENTS

| | | |
|---|---|---|
| 0125828 | 11/1984 | European Pat. Off. . |
| 0151438 | 8/1985 | European Pat. Off. . |
| 0154026 | 9/1985 | European Pat. Off. . |
| 55-67533 | 5/1980 | Japan .................. 65/DIG. 16 |
| 57-92536 | 6/1982 | Japan .................. 65/3.11 |
| 59-06825 | 2/1984 | Japan .................. 65/3.2 |
| 60-54938 | 3/1985 | Japan .................. 65/3.12 |
| 2029400 | 3/1980 | United Kingdom .................. 65/3.11 |

*Primary Examiner*—Kenneth M. Schor
*Attorney, Agent, or Firm*—Cushman, Darby & Cushman

[57] ABSTRACT

A glass preform for use in the fabrication of a dispersion shifted single mode optical fiber is produced by a method for comprising steps of inserting a core member consisting of an inner core part made of a germanium-added quartz glass which optionally contains fluorine and an outer core part made of a quartz glass having a refractive index smaller than that of the inner core part in a glass tube made of a fluorine-added quartz glass having a refractive index smaller than that of the outer core part, heating the core member and the glass tube to collapse the glass tube and fuse them together to produce a glass perform. The glass preform comprises a core member consisting of an inner core part made of $GeO_2$-$SiO_2$ glass or $GeO_2$-F-$SiO_2$ glass and an outer core part made of F-$SiO_2$ glass and a cladding made of F-$SiO_2$ glass and provides a dispersion shifted single mode optical fiber having reduced attenuation of light transmission in the 1.5 μm wavelength band.

3 Claims, 6 Drawing Sheets 4,822,399

GLASS PREFORM FOR DISPERSION SHIFTED SINGLE MODE OPTICAL FIBER AND METHOD FOR THE PRODUCTION OF THE SAME

BACKGROUND OF THE INVENTION

1. Field of the Invention

The present invention relates to a glass preform for use in the fabrication of a dispersion shifted single mode optical fiber and a method for the production of said glass preform. More particularly, it relates to a glass preform for use in the fabrication of a dispersion shifted single mode optical fiber (hereinafter referred to as "dispersion shifted optical fiber") which has a zero dispersion wavelength in a 1.5 μm wavelength band and a method for the production of such glass preform.

2. Description of the Prior Arts

A quartz base optical fiber has minimum attenuation of light transmission in a 1.5 μm wavelength band (1.50–1.60 μm), and a dispersion shifted optical fiber which has a zero dispersion wavelength in the 1.5 μm wavelength band has been studied and developed for use as a long distance optical communication line with a large transmission capacity.

Among the dispersion shifted optical fiber, one having a convex refractive index profile shown in FIG. 1 has less flexural loss than other dispersion shifted optical fibers having simple step-like refractive index profile and better practical advantages, and intensively developed (cf. Ohashi et al, "Characteristics of a dispersion-shifted fibers with a convex profile", National Conference Record, 1985, The Institute of Electronics and Communication Engineers of Japan, The Section of Semiconductor Devices and Materials, paper 413; N. Kuwaki, et al, "Dispersion-shifted convex-index single mode fibers", Electronics Letters, Vol. 21, No. 25/26, 1186–1187, Dec. 5, 1985); and N. Kuwaki et al, "Characteristics of distribution-shifted convex-index fibers with graded center-core", National Conference Record, 1986, The Institute of Electronics and Communication Engineers of Japan, paper 1072).

The refractive index profile of FIG. 1 consists of the largest refractive index 1 corresponding to an inner core, a refractive index 2 smaller than the highest refractive index 1 corresponding to an outer core which surrounds the inner core and the smallest refractive index 3 corresponding to a cladding which surrounds the outer core.

In a dispersion shifted optical fiber having a convex refractive index profile, the refractive index of the inner cor is larger than that of the cladding by about 1.0%. To achieve such refractive index difference between the core and the cladding, $GeO_2$ is generally added to quartz glass of the core to increase its refractive index. However, when the refractive index of the core is increased only by the addition of $GeO_2$, Rayleigh scattering in the glass increases and in turn the attenuation of light transmission of the optical fiber increases. Further, electron transition absorption in UV light range due to reduction of $GeO_2$ to GeO increases, and its influence reaches to the 1.5 μm wavelength band which is used for light transmission, whereby the attenuation of light transmission increases.

Another way to achieve such refractive index difference between the core and the cladding, $B_2O_3$ or fluorine is added to the cladding glass to decrease its refractive index. Particularly, fluorine is useful to produce the optical fiber having low attenuation since it does not have any absorption band near the 1.5 μm wavelength band while $B_2O_3$ has such absorption band. Therefore, the decrease of the added amount of $GeO_2$ to the core by the addition of fluorine to the cladding is an effective measure to decrease attenuation of light transmission of the optical fiber. As the dispersion shifted optical fiber having the convex refractive index profile and containing fluorine in the cladding, proposed was an optical fiber having glass compositions as shown in FIG. 2, which comprises an inner core 21 made of $GeO_2$-$SiO_2$ glass, an outer core 22 made of $SiO_2$ glass and a cladding 23 made of F-$SiO_2$ glass (cf. H. Yokota et al, "Dispersion-shifted fibers with fluorine added cladding by the vapor phase axial deposition method", Technical Digest on Topical Meeting on Optical Fiber Communication (Atlanta, 1986), Paper WF2).

For mass production of a glass preform for an optical fiber, the VAD (Vapor Phase Axial Deposition) method is known and widely employed. However, it is very difficult to produce a glass preform having a complicated refractive index profile suitable for the dispersion shifted optical fiber in which $GeO_2$ and fluorine are selectively added to the inner core and the cladding, respectively by the VAD method.

In addition, according to the above proposal by Yokota et al, the attenuation of light transmission is reduced by the addition of fluorine to the cladding so as to decrease the amount of $GeO_2$ added only to the inner core. According to this proposal, it is possible to decrease attenuation of light transmission of the dispersion shifted optical fiber at a wavelength of 1.55 μm as reported by Shigematsu et al ("Transmission Characteristics of Dispersion-shifted Single-mode Fibers", Technical Study Reports, The Institute of the Electronics and Communication Engineers of Japan, OQE 86-99). In this report, the dispersion shifted optical fiber had a refractive index profile as shown in FIG. 2 and comprised an inner core of 3 μm in diameter (a), an outer core of 9 μm in outer diameter (b) and a cladding of 125 μm in outer diameter (c).

However, it is very difficult and almost impossible to further decrease attenuation of light transmission of the dispersion shifted optical fiber comprising the inner core made of $GeO_2$-$SiO_2$ glass, the outer core made of $SiO_2$ glass and the cladding made of F-$SiO_2$ glass in the 1.5 μm wavelength band.

SUMMARY OF THE INVENTION

One object of the present invention is to provide a simple method for producing a dispersion shifted optical fiber having a convex refractive index profile.

Another object of the present invention is to provide a dispersion shifted optical fiber having improved attenuation of light transmission, particularly in the 1.5 μm wavelength band.

DETAILED DESCRIPTION OF THE DRAWINGS

According to one aspect of the present invention, there is provided a method for producing a glass preform for use in the fabrication of a dispersion shifted single mode optical fiber comprising steps of inserting a core member consisting of an inner core part made of a germanium-added quartz glass which optionally contains fluorine and an outer core part made of a quartz glass having a refractive index smaller than that of the inner core part in a glass tube made of a fluorine-added quartz glass having a refractive index smaller than that of the outer core part, heating the core member and the glass tube to collapse the glass tube and fuse them together to produce a glass preform.

In the method of the present invention, the core member consists of the inner core part and the outer core part. The inner core part may be germanium-added quartz glass ($GeO_2$-$SiO_2$ glass) or a germanium/fluorine-added quartz glass ($GeO_2$-F-$SiO_2$ glass). The outer core part may be substantially pure quartz glass ($SiO_2$ glass) or fluorine-added quartz glass (F-$SiO_2$ glass).

The core member consisting of the inner core part and the outer core part can be produced by various methods. For example, the core member is produced by the VAD method which comprises steps of flame hydrolyzing glass forming raw materials to produce glass soot particles of $SiO_2$ containing $GeO_2$ and optionally fluorine, depositing them on a starting member to form the inner core part, flame hydrolyzing glass raw materials to produce glass soot particles of $SiO_2$, depositing them on the inner core part to form a soot core member consisting of the inner core part and the outer core part, dehydrating and sintering the soot core member and drawing it in an atmosphere not containing hydrogen atom to produce the core member. When the sintering is carried out in an atmosphere containing a fluorine-containing compound, fluorine is added to the core member. Alternatively, the core member is produced by a rod-in-tube method which comprises steps of inserting a rod (inner core part) made of $GeO_2$-$SiO_2$ glass or $GeO_2$-F-$SiO_2$ glass in a tube (outer core part) made of $SiO_2$ glass or F-$SiO_2$ glass, heating the rod-tube composite to melt and integrate them together to produce the core member.

Now the detailed procedures of the VAD method for producing the soot core member are explained.

Figure 3:
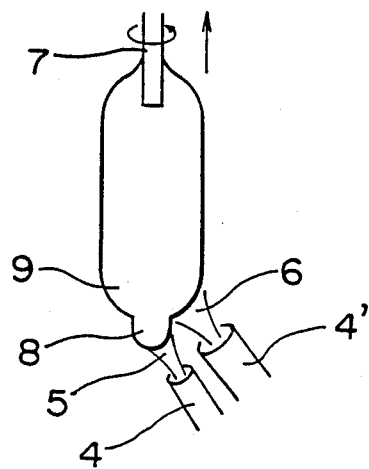

The VAD method is schematically illustrated in FIG. 3, wherein 4 stands for a burner for synthesizing the glass soot particles for the inner core part and 4' stands for a burner for synthesizing the glass soot particles for the outer core part. The glass forming raw materials such as $SiCl_4$ and $GeCl_4$, hydrogen gas, oxygen gas and inert gas such as helium and argon are supplied to the burner 4, and $SiCl_4$, hydrogen gas, oxygen gas and inert gas are supplied to the burner 4' so as to flame hydrolyze the glass forming raw materials in the flame 5 and 6 to synthesize the glass soot particles, which are deposited on a rotating starting quartz rod 7 to form the inner soot core part 8 and the outer soot core part 9. By gradually pulling up the starting rod with rotation, the soot core member grows in the axial direction of the starting rod. Then, the soot core member is dehydrated in an inert gas atmosphere containing a chlorine-containing compound as a dehydrating agent (e.g. $Cl_2$, $SOCl_2$, $CCl_4$, $CCl_2F_2$, etc.) and sintered in an inert gas atmosphere to produce a transparent core member. The dehydrating agent may be contained in the dehydration atmosphere in a concentration of 0.5 to 20% by mole. When the sintering atmosphere contains the fluorine-containing compound such as $SiF_4$, $SF_6$, $CF_4$, $CCl_2F_2$ and the like, fluorine is added to the core member so that the inner core part consists of $GeO_2$-F-$SiO_2$ glass and the outer core part consists of F-$SiO_2$ glass. Such the fluorine-containing compound is contained in the sintering atmosphere in a concentration of 0.1 to 10% by mole. Further, the dehydration and the addition of fluorine to the core material can be carried out simultaneously by adding the dehydrating agent and the fluorine-containing compound to the atmosphere.

The dehydration of the soot core member is carried out in a temperature range in which the glass soot is not vitrified, for example from 900° to 1,400° C. The sintering of the soot core member is carried out in a temperature range higher than the softening pint of the glass, for example, from 1,400° to 1,700° C.

After the core material is sintered, it is drawn to a suitable outer diameter by a conventional method. If a heating source which generates OH groups such as an oxyhydrogen flame is used for drawing, the OH groups migrate deep into the glass body and worsen attenuation of light transmission of the finally fabricated optical fiber.

The tube member can be also produced by a conventional method. For example, a soot glass rod made of pure $SiO_2$ glass is produced by the VAD method, treated in an atmosphere containing the fluorine-containing compound in a concentration of 0.5 to 50% by mole at a temperature of about 1,000° to 1,300° C. to add fluorine to the glass and then heated at a higher temperature of about 1,600° C. to vitrify the glass rod. Thereafter, a center part of the glass rod along its axis is bored by a conventional method, for example by an ultrasonic boring machine to produce the glass tube having a bore with a suitable diameter through which the core member is inserted. If necessary, the glass tube is drawn to reduce its diameter and bore diameter. The inner surface of the glass tube may be etched by flowing a gaseous fluorine-containing etchant such as $SF_6$ in the bore with heating the tube by an oxyhydrogen flame.

When the outer core part of the core member contains fluorine, the content of fluorine in the glass tube should be larger than that in the outer core part to achieve the refractive index difference between the outer core part and the cladding.

The thus produced core member and the glass tube is integrated according to procedures of a conventional rod-in-tube method. For example, the core member is inserted in the glass tube and then heated with, for example, an oxyhydrogen flame from outside of the glass tube to shrink the glass tube to integrate it with the core member to produce the glass preform for use in the fabrication of the dispersion shifted optical fiber.

Around the integrated glass preform, additional glass soot particles may be deposited, added with fluorine and vitrified to produce a glass preform in which fluorine is homogeneously added to the outermost layer of the cladding. Alternatively, the integrated glass preform may be inserted in a glass tube added with fluorine and again integrated to produce a glass preform in which fluorine is homogeneously added to the outermost layer of the cladding.

According to the method of the present invention, glass preforms having various refractive index profiles can be produced. Among them, the glass preform comprising the inner core part made of $GeO_2$-$SiO_2$ glass or $GeO_2$-F-$SiO_2$ glass, the outer core part made of F-$SiO_2$ glass and the cladding made of F-$SiO_2$ glass is novel and preferred to the glass preform comprising the inner core part made of $GeO_2$-$SiO_2$ glass, the outer core pare made of pure $SiO_2$ glass and the cladding made of F-$SiO_2$ glass having the refractive index profile of FIG. 2, since it is rather difficult to further decrease attenuation of light transmission of the optical fiber fabricated from the latter glass preform in the 1.5 $\mu$m wavelength band.

Figure 1:
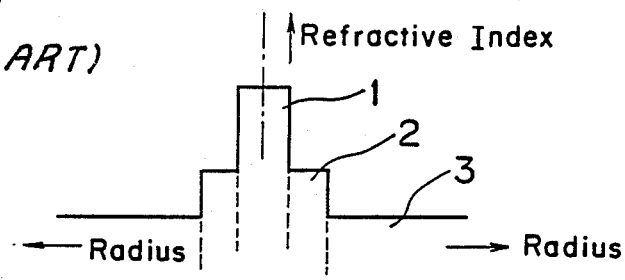
FIG. 1 shows a typical convex refractive index profile of a dispersion shifted optical fiber.
Figure 2:
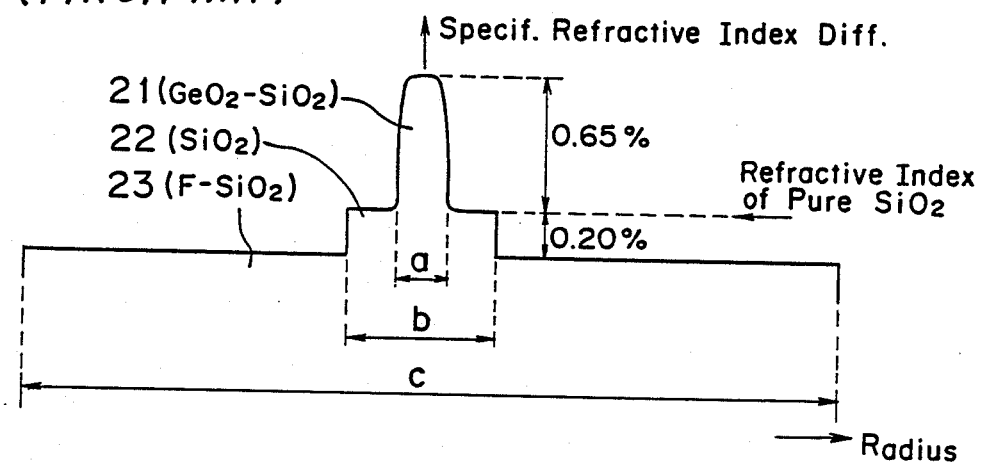
FIG. 2 shows a convex refractive index profile of a conventional dispersion shifted optical fiber, FIG. 3 schematically shows the VAD method.

In the optical fiber having the refractive index profile of FIG. 2, attenuation of light transmission may be caused by following reasons:

(1) $GeO_2$ contained in the inner core part induces Rayleigh scattering. Further, tetravalent Ge ($GeO_2$) is reduced to divalent Ge (GeO) at high temperature encountered for example, in the drawing step, and divalent Ge forms absorption center of electron transition which absorbs light in the U.V. range, which influences the attenuation in the 1.5 $\mu$m wavelength band.

(2) During drawing, since the outer core part made of pure $SiO_2$ glass becomes more viscous than the inner core part made of $GeO_2$-$SiO_2$ glass and the cladding made of F-$SiO_2$ which sandwich the outer core part, tension is focused on the outer core part so that defects which may cause attenuation of light transmission in the U.V. range may be produced.

When fluorine is added to the outer core part to decrease its refractive index, the amount of $GeO_2$ which increases the refractive index of the inner core part can be reduced. Thereby, the above described drawback (1) can be minimized. Further, the addition of fluorine to the outer core part decreases the viscosity of the glass. Therefore, the above drawback (2) can be also overcome.

In addition, when fluorine is added to the inner core part, reduced Ge, namely divalent Ge will form a Ge-F bonding, whereby the absorption in the U.V. range can be suppressed. Further, the Ge-F bonding will suppress the reduction of Ge(IV).

The present invention will be explained further in detail by following examples.

EXAMPLE 1

1A. Production of Core Member

In the VAD method schematically shown in FIG. 3, a multi-tube burner was used as the burner 4 for synthesizing the glass soot of the inner core part, and $SiCl_4$, $GeCl_4$, argon, hydrogen and oxygen were supplied thereto at the following rates:

| | |
|---|---|
| $SiCl_4$: | 120 ml/min. |
| $GeCl_4$: | 20 ml/min. |
| Argon: | 2.5 l/min. |
| Hydrogen: | 3 l/min. |
| Oxygen: | 6 l/min. |

To the burner 4 for synthesizing the glass soot of the outer core part, $SiCl_4$, argon, hydrogen and oxygen were supplied at the following rates:

| | |
|---|---|
| $SiCl_4$: | 350 ml/min. |
| Argon: | 3.0 l/min. |
| Hydrogen: | 12 l/min. |
| Oxygen: | 6 l/min. |

Thereby, a soot core member having an outer diameter of 100 mm and a length of 500 mm was produced The soot core member was then passed through a ring-type electric furnace kept at 1,100° C. containing an atmosphere of helium and chlorine in a volume ratio of 40:1 (He:$Cl_2$) at a rate of 5 mm/min. to dehydrate it. Thereafter, the dehydrated soot core member was passed through the ring-type electric furnace kept at 1,600° C. containing a pure helium atmosphere at a rate of 4 mm/min. to produce a transparent core member having an outer diameter of 40 mm and a length of 200 mm.

Figure 4:
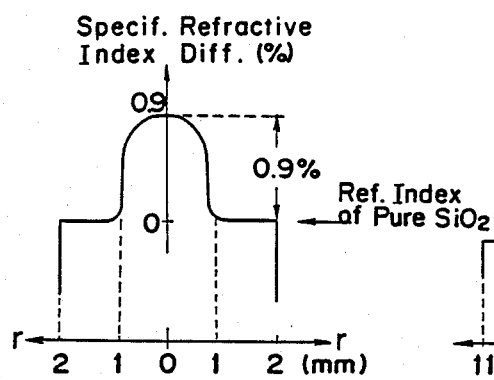
FIG. 4 is a refractive index profile of the core member produced in the step 1A of Example 1.

The transparent core member was heated in the ring-type electric furnace kept at 1,850° C. and drawn to an outer diameter of 4 mm and cut to portions each of about 300 mm long. The refractive index profile of the drawn core member is shown in FIG. 4.

The core member was immersed in a 10% HF solution for 3 hours to clean the surface.

1B. Production of Glass Tube for Cladding

By the VAD method, a pure $SiO_2$ soot body having an outer diameter of 120 mm and a length of 600 mm was produced and passed through the ring-type electric furnace kept at 1,150° C. containing an atmosphere of helium, $SiF_4$ and chlorine in a volume ratio of 15:0.08:0.15 (He:$SiF_4$:$Cl_2$) at a rate of 2 mm/min. to dehydrate it and add fluorine to it followed by passing it through the ring-type electric furnace kept at 1,600° C. containing an atmosphere of helium and $SiF_4$ in a volume ratio of 15:0.08 at a rate of 6 mm/min. to produce a transparent glass rod having an outer diameter of 50 mm and a length of 280 mm and containing fluorine in a concentration of about 0.05% by weight.

Then, a bore having a diameter of 8 mm was made in the center part of the the glass rod along its axis by means of an ultrasonic boring machine. Then the bored rod was heated by an oxyhydrogen flame and drawn to produce a glass tube having an outer diameter of 25 mm, an inner diameter of 4 mm and a length of 1,120 mm, which was cut to portions each about 280 mm long. The glass tube was then etched by flowing $SF_6$ and oxygen at rates of 200 ml/min. and 600 ml/min., respectively in the bore with heating the tube by the oxyhydrogen flame to smoothen the inner surface of the tube and to enlarge the inner diameter to 6 mm.

1C. Integration of Core Member and Glass Tube

Figure 5:
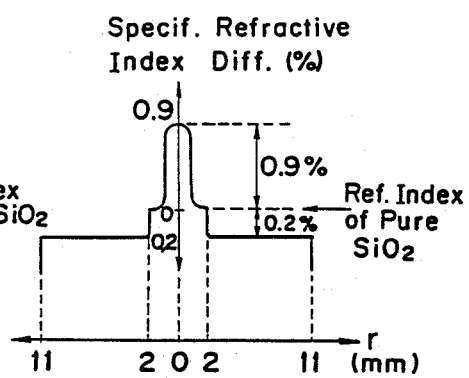
FIG. 5 is a refractive index profile of the glass preform produced in the step 1C of Example 1, FIG. 6 schematically shows a method for synthesizing and depositing glass soot particles on the glass preform in the step 1D of Example 1.

The core member produced in the step 1A was inserted in the glass tube produced in the step 1B and heated by the oxyhydrogen from outside to clean the outer surface of the core member and the inner surface of the glass tube. Then the glass tube was heated and shrunk to integrate it with the core member to form the glass preform, the refractive index profile of which is shown in FIG. 5.

1D. Subsequent Steps

Figure 6:
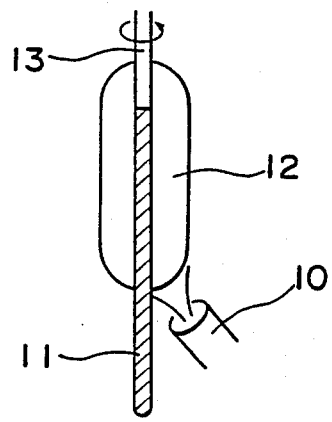
Figure 7:
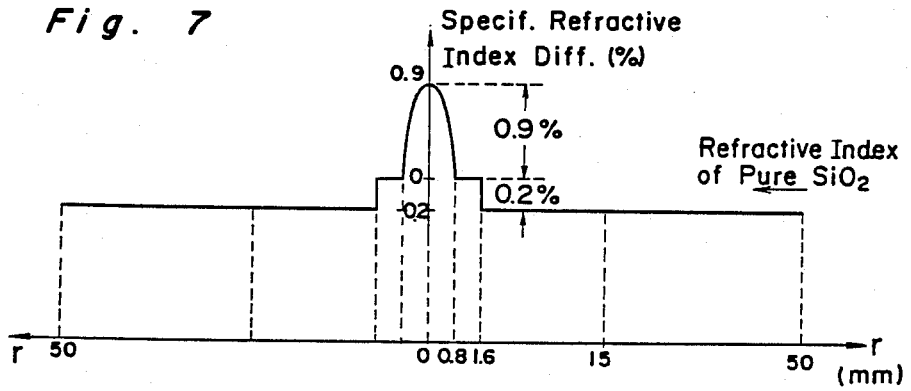
FIG. 7 is a refractive index profile of the glass preform produced in the step 1D of Example 1, FIG. 8 schematically shows a method for producing the inner core part in the step 2A of Example 2, FIG. 9 schematically shows a method for integrating the inner core part and the glass tube for the outer core part.

After the glass preform produced in the step 1C was drawn to an outer diameter of 15 mm, glass soot particles 12 of pure $SiO_2$ were deposited around the glass preform 11 attached to a supporting rod 13 by means of a burner 10 for synthesizing glass soot particles as shown in FIG. 6 and then vitrified under the same conditions in the step 1B to produce a glass preform having a refractive index profile shown in FIG. 7. The produced preform was drawn to an outer diameter of 125 μm to fabricate a dispersion shifted optical fiber. It had zero dispersion wavelength at 1.552 μm and attenuation of light transmission of 0.25 dB/km at 1.55 μm, which are satisfactory for practical use.

EXAMPLE 2

2A. Production of Inner Core Part

Figure 8:
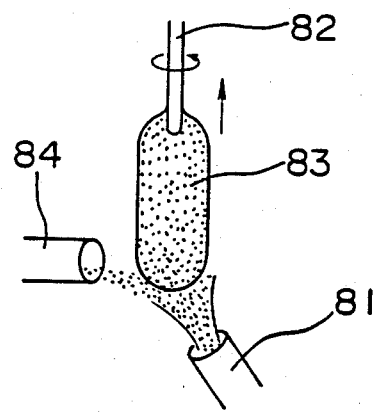

By the method schematically shown FIG. 8, a porous glass body 83 for an inner core part was produced by supplying $SiCl_4$, $GeCl_4$, argon, hydrogen and oxygen to the burner 81 at the following rates:

| | |
|---|---|
| $SiCl_4$: | 530 ml/min. |
| $GeCl_4$: | 33 ml/min. |
| Argon: | 1.5 l/min. |
| Hydrogen: | 5.5 l/min. |
| Oxygen: | 7.5 l/min. | to synthesize glass soot particle in the flame, depositing the soot particles on a quartz starting rod 82 with rotating it at a rate of 30 rpm and pulling it up at a rate of 70 mm/hr. The produced porous glass body had an outer diameter of 90 mm, a length of 500 mm and a weight of 600 g. The unreacted gasses were exhausted from an outlet 84.

Then, the porous glass body was heated and dehydrated at 1,050° C. in an atmosphere of helium and chlorine in a volume ratio of 100:6 and further heated at 1,600° C. in a pure helium atmosphere to produce a transparent glass body having an outer diameter of 35 mm and a length of 200 mm.

The transparent glass body was drawn in an electric furnace kept at about 1,800° to 1,900° C. to an outer diameter of 10 mm and cut to portions each 400 mm long. If a heating source which generates OH groups such as an oxyhydrogen flame is used for drawing, the OH groups migrate deep into the glass body and worsen attenuation of light transmission.

2B. Production of Outer Core Part

By the same method as in the above step 2A but supplying $SiCl_4$, argon, hydrogen and oxygen from the burner 81 at the following rates, glass soot particles were deposited on the starting rod to produce a glass soot body having an outer diameter of 110 mm, a length of 600 mm and a weight of 1,100 g:

| | |
|---|---|
| $SiCl_4$: | 1,500 ml/min. |
| Argon: | 12 l/min. |
| Hydrogen: | 30 l/min. |
| Oxygen: | 35 l/min. |

The glass soot body was then heated and dehydrated at 1,050° C. in an atmosphere of helium and chlorine in a volume ratio of 100:5 and further heated at 1,250° C. in an atmosphere of helium and $SiF_4$ in a volume ratio of 100:3 to add fluorine to the glass soot body. Thereafter, the fluorine added glass soot body was heated at 1,600° C. in an atmosphere of helium and $SiF_4$ in a volume ratio of 1,000:3 to produce a transparent glass rod having an outer diameter of 45 mm and a length of 280 mm and homogeneously containing fluorine in a concentration of about 0.6% by weight.

At the center of the glass rod, a bore having a diameter of 15 mm was made and the bored rod was drawn to an outer diameter of 30 mm and an inner diameter of 10 mm by heating it with an oxyhydrogen flame, followed by cutting to portions each 13 mm long.

Further, the glass tube was etched by heating it from outside with flowing $SF_6$ through the bore to smoothen the inner surface of the tube and to enlarge the inner diameter to 13 mm.

2C. Integration of Inner and Outer Core Parts

Figure 9:
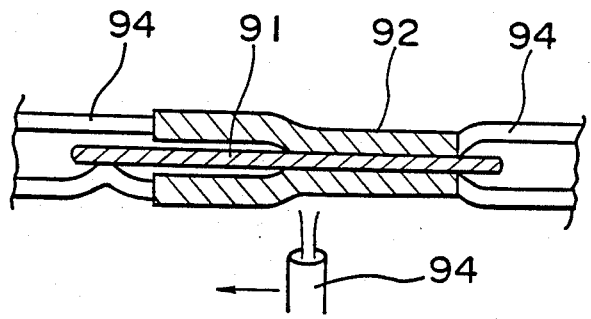
Figure 10:
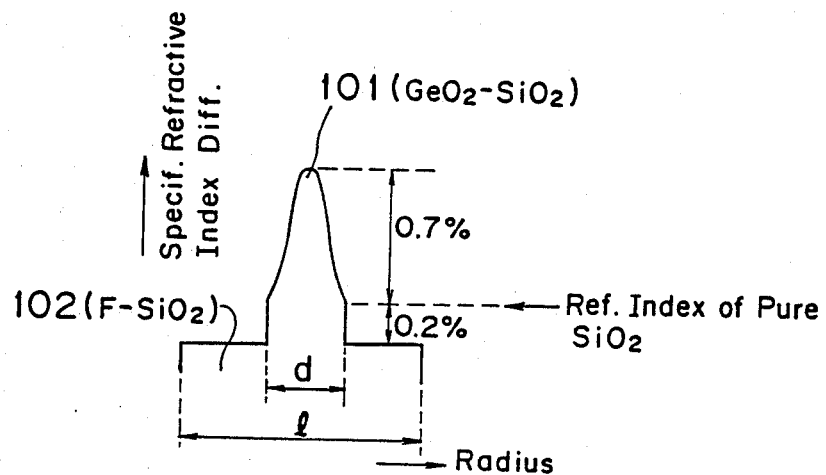
FIG. 10 is a refractive index profile of the core member produced in the step 2C of Example 2.

The transparent inner core part 91 produced in the step 2A was inserted in the glass tube 92 produced in the step 2B and they were integrated by means of a glass lathe as shown in FIG. 9, in which the glass tube 92 was supported by a pair of quartz tubes 94 which were attached to chucks (not shown) of the lathe and heated by an oxyhydrogen burner 93. With rotating the glass tube 92, the burner 93 was traveled from one end to the other end of the tube 92 to heat and shrink the glass tube so as to integrate it with the inner core part 91. Preferably, the space between the inner core part 91 and the glass tube 92 is filled with an atmosphere containing a dehydrating agent such as chlorine to prevent contamination of an interfacial surface between them with the OH groups. The integrated core member consisted of the inner core part of 10 mm in diameter ("d" in FIG. 10) and the outer core part of 26 mm in outer diameter ("l" in FIG. 10) and had a length of 250 mm and a refractive index profile as shown in FIG. 10.

Since the peripheral surface of the core member was contaminated with the OH groups due to heating by the oxyhydrogen flame, it was mechanically abrased to an outer diameter of 23 mm to remove the contaminated glass layer. Then the core member was drawn to an outer diameter of 3.8 mm in an electric furnace and cut to portions each 450 mm long.

2D. Production of Glass Tube for Cladding

The same porous glass rod as produced in the step 2B was heated and dehydrated in an atmosphere of helium and chlorine in a volume ratio of 100:5 at 1,050° C. and further heated in an atmosphere of helium and $SiF_4$ in a volume ratio of 100:4 at 1,250° C. to add fluorine to the glass rod. Thereafter, the fluorine added glass rod was heated in an atmosphere of helium and $SiF_4$ in a volume ratio of 100:4 at 1,600° C. to produce a transparent glass tube containing fluorine in a concentration of 1.2% by weight.

Then, a bore having a diameter of 8 mm was made in the center part of the the glass rod along its axis by means of an ultrasonic boring machine. Then the bored rod was heated by an oxyhydrogen flame and drawn to produce a glass tube having an outer diameter of 22.5 mm, an inner diameter of 4 mm, which was cut to portions each 300 mm long. The glass tube was then etched by flowing $SF_6$ and oxygen at rates of 300 ml/min. and 600 ml/min., respectively in the bore with heating the tube by the oxyhydrogen flame to smoothen the inner surface of the tube and to enlarge the inner diameter to 7 mm.

2E. Integration of Core Member and Glass Tube

Figure 11:
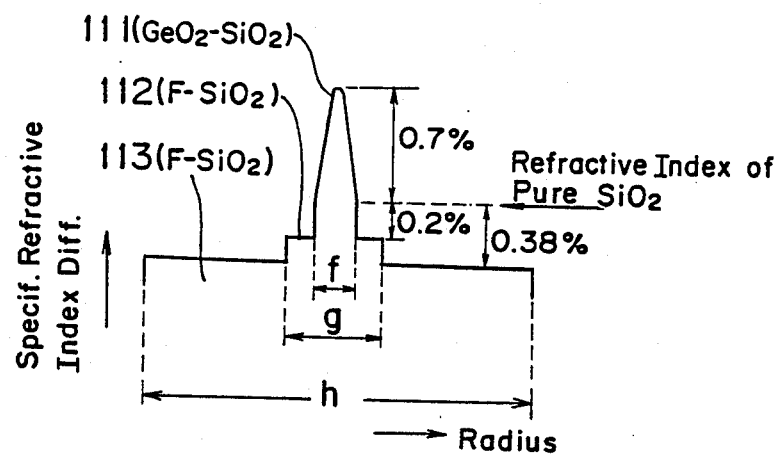
FIG. 11 is a refractive index profile of the glass preform produced in the step 2E of Example 2.

The core member produced in the step 2C was inserted in the glass tube produced in the step 2D and heated to integrate them together in the same manner as in the above step 2C to produce a glass preform consisting of the core member and the cladding which had a refractive index profile as shown in FIG. 11, in which the diameter "f" was 1.65 mm, the diameter "g" was 3.8 mm and the diameter "h" was 18.5 mm.

2F. Production of Optical Fiber

Around the glass preform produced in the step 2E, pure $SiO_2$ glass soot particles were deposited in the same manner as in the step 1D of Example 1 but supplying $SiCl_4$, argon, helium and oxygen to the burner at the following rates:

| | |
|---|---|
| $SiCl_4$: | 1,800 ml/min. |
| Argon: | 12 l/min. |
| Hydrogen: | 35 l/min. |
| Oxygen: | 35 l/min. |

Then, the glass preform having the soot glass layer was dehydrated, fluorine added and vitrified in the same manner as in the step 2D to produce a transparent glass preform having an outer diameter of 55 mm. In the vitrification step, the diameter "h" increased to 21 mm due to shrinking force of the porous glass. The transparent glass preform was drawn to an outer diameter of 25 mm and further drawn to fabricate a dispersion shifted optical fiber fiber having an outer diameter of 125 μm.

Figure 12:
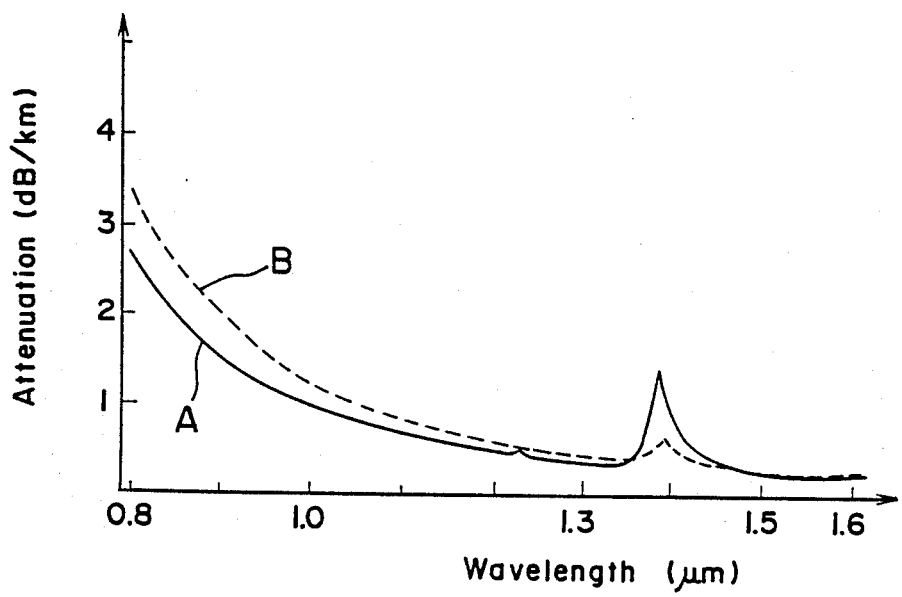
FIG. 12 shows attenuation spectra of the optical fiber fabricated from the glass preform produced in Example 2 and of the comparative optical fiber, FIG. 13 schematically shows another method for depositing glass soot particles on the glass preform.

The dispersion shifted optical fiber of this Example had an attenuation spectrum shown in FIG. 12 (solid line A). Its attenuation of light transmission was 0.202 dB/km at a wavelength of 1.55 μm.

For comparison, an attenuation spectrum of an optical fiber having a refractive index profile of FIG. 2 is also shown in FIG. 12 (broken line B). This optical fiber has low attenuation of light transmission at a wavelength of 1.55 μm but the difference attenuation of light transmission between the optical fiber of the invention and the comparative optical fiber increases as wavelength decreases. This means that attenuation of light transmission in the U.V. range is suppressed by the present invention.

Figure 13:
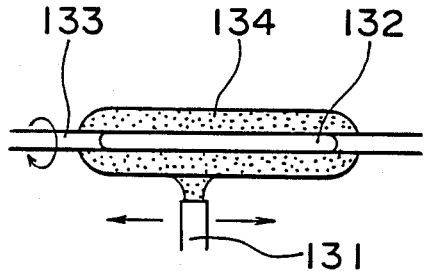

In Example 2, the deposition of the glass soot particles in the step 2E may be carried out in a method schematically shown in FIG. 13, in which the burner 131 and the glass preform 132 connected to a quartz rod 133 are moved horizontally in relation to each other. This method can be modified by supporting the glass preform vertically and moving the burner and the glass preform vertically. Further, the deposition of the glass soot particles in the step 2E may be neglected, when the glass tube for the cladding has enough wall thickness.

EXAMPLE 3

3A. Production of Core Member In the same manner as in the step 1A of Example 1 but supplying $SiCl_4$, $GeCl_4$, argon, hydrogen and oxygen to the burner 3 at the following rates:

| | |
|---|---|
| $SiCl_4$: | 85 ml/min. |
| $GeCl_4$: | 4.2 ml/min. |
| Argon: | 3.5 l/min. |
| Hydrogen: | 3.0 l/min. |
| Oxygen: | 10 l/min. | and supplying $SiCl_4$, argon, hydrogen and oxygen to the burner 4 at the following rates:

| | |
|---|---|
| $SiCl_4$: | 300 ml/min. |
| Argon: | 2 l/min. |
| Hydrogen: | 8.0 l/min. |
| Oxygen: | 5.0 l/min. | a soot core member having an outer diameter of 80 mm (a diameter of the inner core part of 25 mm) and a length of 500 mm was produced with a pulling up rate of 50 mm/min.

Figure 14:
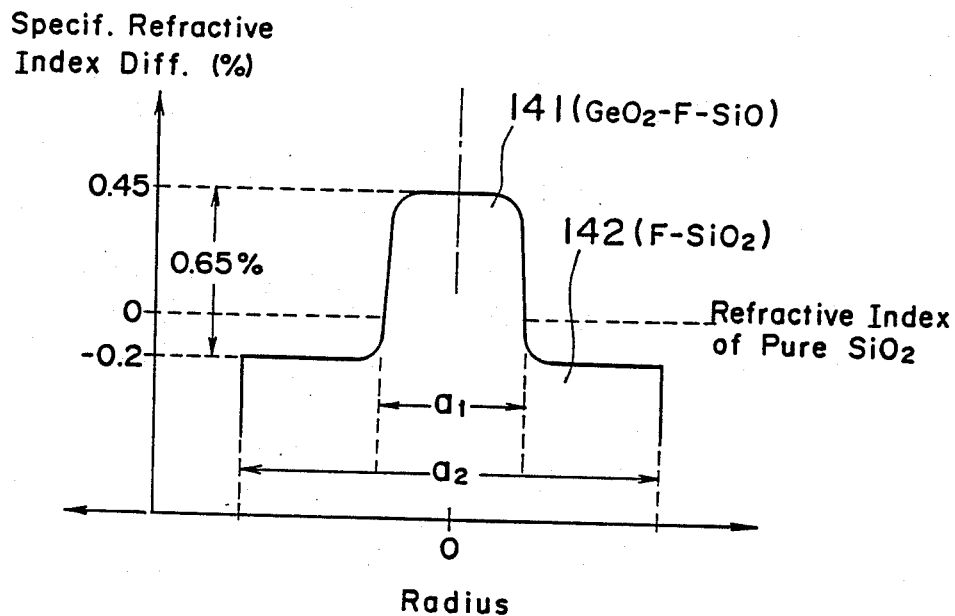
FIG. 14 is a refractive index profile of the core member produced in the step 3A of Example 3.

The soot core member was then inserted in a ring-type electric furnace kept at 1,050° C. containing an atmosphere of helium and chlorine in a volume ratio of 100:3 ($He:Cl_2$) to dehydrate it. Thereafter, the dehydrated soot core member was heated in the ring-type electric furnace kept at 1,200° C. containing an atmosphere of helium and $SiF_4$ in a volume ratio of 1,000:5 to add fluorine to the glass and further heated at 1,600° C. in an atmosphere of helium and $SiF_4$ in a volume ratio of 1,000:5 to produce a transparent core member having an outer diameter of 35 mm and a inner core diameter of 12 mm. The core member had a refractive index profile as shown in FIG. 14, in which "$a_1$" and "$a_2$" stand for a diameter (12 mm) of the inner core part and a diameter (35 mm) of the outer core part, respectively.

The transparent core member was heated in the electric furnace kept at about 1,900° C. and drawn to an outer diameter of 3.8 mm.

If a heating source which generates OH groups such as an oxyhydrogen flame is used for drawing, the OH groups migrate deep into the glass body and worsen attenuation of light transmission.

3B. Production of Glass Tube for Cladding

By the VAD method, a pure $SiO_2$ soot body having an outer diameter of 110 mm and a length of 550 mm was produced by supplying $SiCl_4$, argon, hydrogen and oxygen at the following rates:

| | |
|---|---|
| $SiCl_4$: | 1,600 ml/min. |
| Argon: | 15 l/min. |
| Hydrogen: | 30 l/min. |
| Oxygen: | 25 l/min. |

The soot body was heated in a furnace kept at 1,050° C. containing an atmosphere of helium and chlorine in a volume ratio of 100:3 ($He:Cl_2$) it and then heated at 1,200° C. in an atmosphere of helium and $SiF_4$ in a volume ratio of 100:8 to add fluorine to it followed by heating it at 1,600° C. in an atmosphere of helium and SiF₄ in a volume ratio of 100:8 to produce a transparent glass rod having an outer diameter of 50 mm and a length of 270 mm.

Then, a bore having a diameter of 8 mm was made in the center part of the the glass rod along its axis by means of an ultrasonic boring machine. Then the bored rod was heated by an oxyhydrogen flame and drawn to produce a glass tube having an outer diameter of 22 mm and an inner diameter of 3.5 mm. The glass tube was then etched by flowing $SF_6$ at a rate of 300 ml/min. in the bore with heating the tube by the oxyhydrogen flame to smoothen the inner surface of the tube and to enlarge the inner diameter to about 7 mm. By etching, flaws and unevenness on the inner surface were removed to generate a smooth inner surface.

3C. Integration of Core Member and Glass Tube

Figure 15:
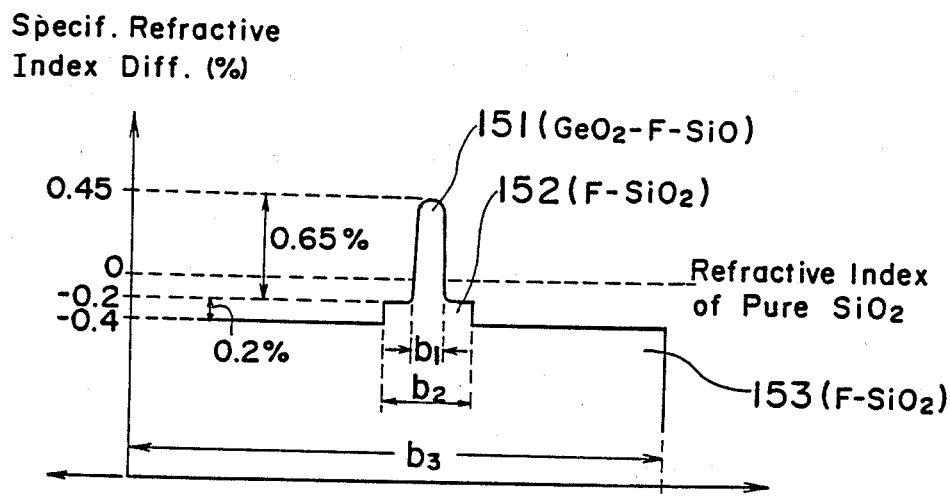
FIG. 15 is a refractive index profile of the glass preform produced in the step 3C of Example 3, and FIG. 16 attenuation spectra of the optical fiber fabricated from the glass preform produced in Example 3 and of the comparative optical fiber.

The core member produced in the step 3A was inserted in the glass tube produced in the step 3B and heated by the oxyhydrogen from outside to a temperature of 1,700° to 1,800° C. of the outer surface of the glass tube to shrink it to fuse them together to form the glass preform, the refractive index profile of which is shown in FIG. 15, in which the diameter $b_1$ of the inner core part was 1.3 mm, the diameter $b_2$ of the outer diameter was 3.8 mm and the outer diameter $b_3$ of the glass preform was 19 mm.

3D. Production of Optical Fiber

After the glass preform produced in the step 3C was drawn to an outer diameter of 16 mm, glass soot particles of pure $SiO_2$ were deposited around the glass preform in the same manner as in the step 1D of Example 1 and then dehydrated, fluorine added and vitrified in the same manner as in the step 3B of this Example to produce a glass preform having an outer diameter of 55 mm. In the vitrification step, the diameter of the center glass preform was increased from 15 mm to about 21 mm due to shrinking force of the soot particles. Then, this glass preform was drawn to an outer diameter of 25 mm and further drawn to fabricate a dispersion shifted optical fiber having an outer diameter of 125 μm.

Figure 16:
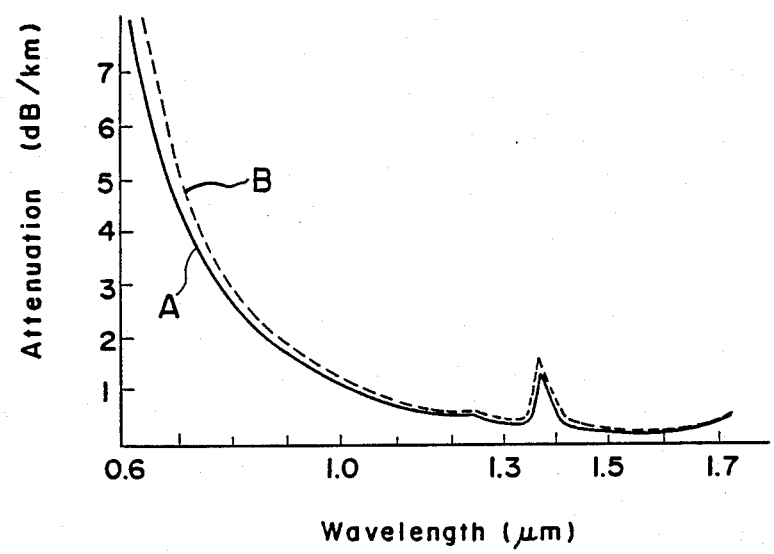

The dispersion shifted optical fiber of this Example had a transmission loss spectrum as shown in FIG. 16. (solid line A). Its attenuation of light transmission was 0.205 dB/km at a wavelength of 1.55 μm.

What is claimed is:

1. A method for producing a glass preform for use in the fabrication of a dispersion shifted single mode optical fiber comprising steps of:

preparing a core member by flame hydrolyzing glass forming raw materials to produce glass soot particles of $SiO_2$ containing $GeO_2$, depositing glass soot particles on a starting member to form an inner core part, flame hydrolyzing glass raw materials to produce glass soot particles of $SiO_2$, depositing the glass soot particles on the inner core part to form a soot core member consisting of the inner core part and an outer core part, dehydrating and sintering the soot core member to form a vitrified core member, and drawing the vitrified core member in an atmosphere not containing hydrogen atoms to produce an elongated core member, preparing a cladding member by flame hydrolysing glass forming raw material to produce glass soot particles of $SiO_2$, depositing them on a starting member to form a soot glass rod, dehydrating the soot glass rod, heating it in an atmosphere containing a fluorine-containing compound, sintering the soot glass rod to form a vitrified glass rod, and boring a center part of the vitrified glass rod along its axis to form a tube shape cladding member, inserting the elongated core member consisting of the inner core part made of a germania-added quartz glass and the outer core part made of the quartz glass having a refractive index smaller than that of the inner core part in the tube shape cladding member made of the fluorine-added quartz glass having a refractive index smaller than that of the outer core part, and heating the core member and the tube shape cladding member to collapse the tube shape cladding member and fuse them together to produce a glass preform.

2. A method according to claim 1, wherein sintering of the soot core member is carried out in an atmosphere containing a fluorine-containing compound.

3. A method according to claim 1, wherein the germania-added glass further contains fluorine.

* * * * *